UNITED STATES PATENT OFFICE.

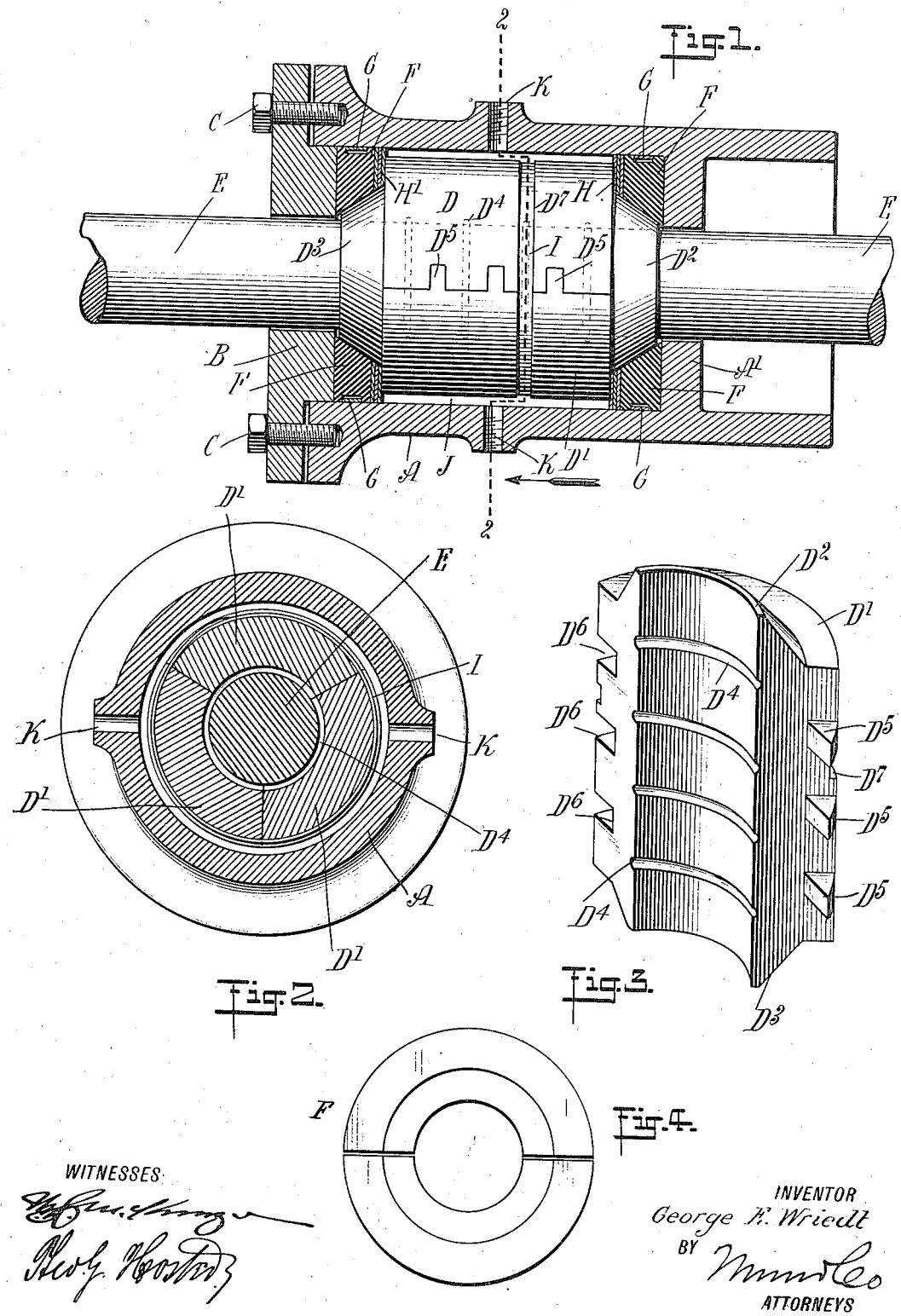

GEORGE E. WRIEDT, OF NEW YORK, N. Y.; WILLIAM A. KRUGER EXECUTOR OF SAID WRIEDT, DECEASED.

PACKING.

1,045,088. Specification of Letters Patent. Patented Nov. 19, 1912.

Application filed February 28, 1912. Serial No. 680,488.

*To all whom it may concern:*

Be it known that I, GEORGE E. WRIEDT, a citizen of the United States, and a resident of the city of New York, borough of Brooklyn, in the county of Kings and State of New York, have invented a new and Improved Packing, of which the following is a full, clear, and exact description.

The object of the invention is to provide a new and improved packing which is simple and durable in construction, very effective in operation, more especially designed for use on piston rods, valve stems and the like, and arranged to allow convenient adjustment with a view to take up wear.

For the purpose mentioned, use is made of a tubular packing made in sections and encircling the rod or stem, the sections being provided with conical ends, and rings having conical openings engaging the said conical ends for holding the sections together and pressing the same against the rod or stem.

A practical embodiment of the invention is represented in the accompanying drawings forming a part of this specification, in which similar characters of reference indicate corresponding parts in all the views.

Figure 1 is a plan view of the packing as applied to a stuffing box, parts being shown in section; Fig. 2 is a transverse section of the same on the line 2—2 of Fig. 1; Fig. 3 is a perspective view of one of the sections of the tubular packing; and Fig. 4 is a face view of one of the packing rings.

The stuffing box A is provided with the usual wall A' and is adapted to be closed at the outer end by a gland B fastened in place by screws C, and within the stuffing box A is arranged a tubular packing D, preferably made of metal, and in longitudinal sections D' encircling a piston rod valve stem or a like part E extending centrally through the stuffing box A, as plainly indicated in Fig. 1. The tubular packing D is provided with conical ends $D^2$, $D^3$, of which the conical end $D^2$ is engaged by a conical opening in a packing ring F seated against the inner wall A' of the stuffing box A. The conical end $D^3$ is engaged by a conical opening in a packing ring F' seated against the inner end of the gland B, and when the gland B is screwed up then pressure is exerted against the packing ring F' and consequently against the packing D and the packing ring F to cause the packing rings F and F' to act on the conical ends $D^2$, $D^3$ thereby pressing the sections D' inward against the peripheral face of the rod or stem E. Each of the packing rings F and F' is provided on its peripheral face with a metallic packing ring G fitting against the inner surface of the stuffing box A so as to provide a tight joint between the said rings and the inner surface of the stuffing box A. Washers H and H' are interposed between the packing rings F and F' and the adjacent end faces of the tubular packing D to permit of taking up wear by inserting more washers whenever it is deemed necessary. The packing rings F, F' and washers H, H' are made in sections to permit of placing the same in position on the rod or stem E. The tubular packing D is provided at the inner surface with grooves $D^4$, and each section D' of the said packing D is provided at one side with beveled lugs $D^5$ and on the other side with beveled notches or recesses $D^6$ engaged by the lugs $D^5$ of the next following section, so that the sections are held against longitudinal movement and are free to slide inward or outward to properly fit the peripheral face of the rod or stem E. A split ring I with overlapping ends fits into an annular groove $D^7$ of the packing D to hold the sections D' in position.

The tubular packing D forms with the inner surface of the stuffing box A an annular chamber J for the passage of the steam to outlet openings K, preferably arranged on opposite sides of the stuffing box A, and connected by pipes to a condenser or other means for producing suction action in the chamber J to draw the steam out of the same and thus relieve the packing of pressure.

The packing shown and described is very simple and durable in construction, can be readily placed in position on the stuffing box and allows convenient adjustment to hold the metallic sections D' of the tubular packing D in proper position on the peripheral face of the rod or stem E. In case of wear of the inner surfaces of the sections D' it is only necessary for the operator to screw up the bolt C so as to move the gland B inwardly with a view to press the sections D' inward against the rod or stem E, as previously explained.

Having thus described my invention, I claim as new and desire to secure by Letters Patent:

1. A packing, comprising a tubular cylindrical body made in longitudinal sections and having an external annular groove and reduced conical ends, shoulders being formed at the bases of the conical ends, each section having grooves on its inner face and beveled lugs on one side and beveled recesses in its other side, a split ring in the groove of the body, sectional rings having annular exterior grooves and conical openings receiving the conical ends of the body, a packing ring in the groove of each of the sectional rings, and washers between the split rings and the shoulders of the body.

2. A packing, comprising a tubular cylindrical body made in longitudinal sections and having reduced conical ends, a shoulder being formed at the base of each conical end, a split ring in the groove of the body, each of the sections having beveled lugs projecting from one side and recesses in its other side, split rings having conical openings receiving the conical ends of the body, and washers between the rings and the shoulders of the body.

3. A packing, comprising a tubular cylindrical body made in longitudinal sections and having reduced conical ends, shoulders being formed at the base of the conical ends, each section having lugs on one side and recesses in its other side, and washers between the rings and the shoulders of the body.

In testimony whereof I have signed my name to this specification in the presence of two subscribing witnesses.

GEORGE E. WRIEDT.

Witnesses:
WILLIAM A. KRÜGEN,
FREDERICK A. SCHNEIDER.